No. 643,838. Patented Feb. 20, 1900.
A. G. CARTER.
PLOW.
(Application filed Aug. 4, 1899.)
(No Model.)
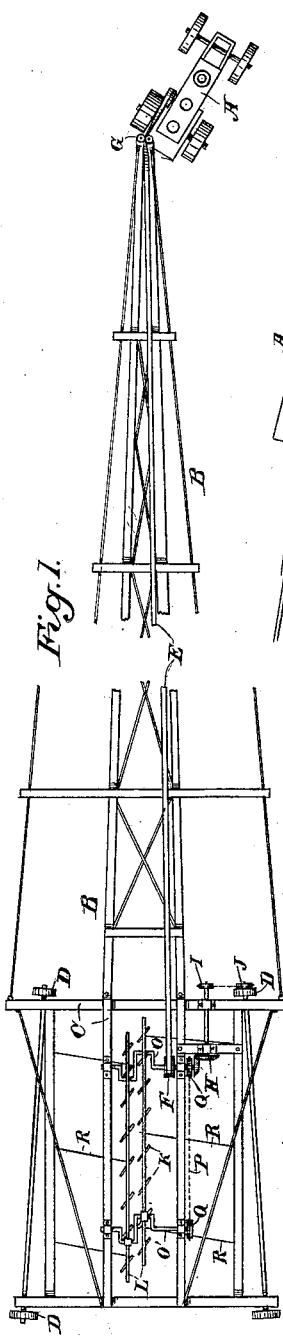
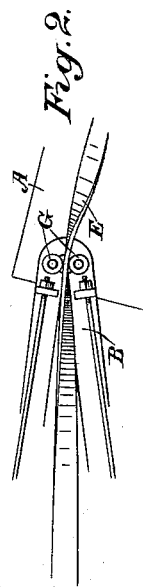
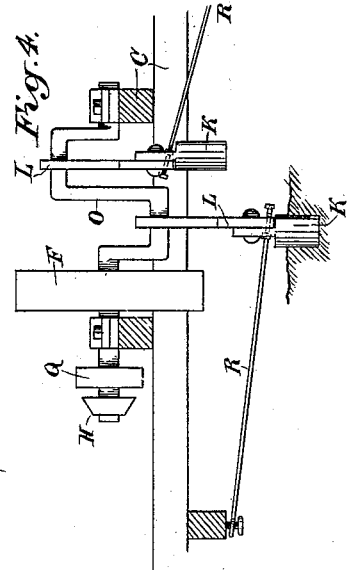
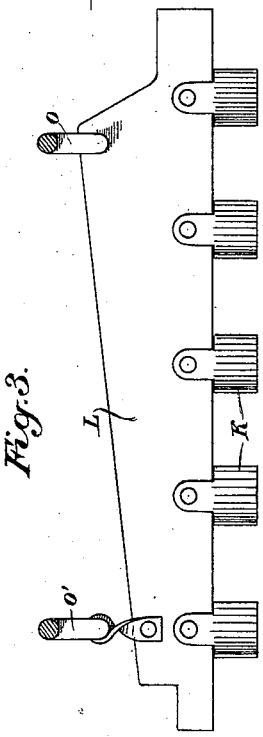
Witnesses,
Inventor,
Alexander G. Carter
By Dewey Strong & Co.
Attys

UNITED STATES PATENT OFFICE.

ALEXANDER G. CARTER, OF FRESNO, CALIFORNIA.

PLOW.

SPECIFICATION forming part of Letters Patent No. 643,838, dated February 20, 1900.

Application filed August 4, 1899. Serial No. 726,070. (No model.)

*To all whom it may concern:*

Be it known that I, ALEXANDER G. CARTER, a citizen of the United States, residing at Fresno, county of Fresno, State of California, have invented an Improvement in Plows; and I hereby declare the following to be a full, clear, and exact description of the same.

My invention relates to an improved means for cultivating the ground.

It consists of a frame mounted upon wheels and carrying the plowing or cultivating mechanism, with a means for operating the same, a boom having one end connected with said frame, a distant center to which the opposite end of the boom is connected and about which the plow-frame is caused to move alternately from one end to the other of its arc of travel, and an engine upon which said center of motion is located and from which power is derived to actuate the plowing mechanism, said engine also acting to advance the plow after each cut has been completed.

It also comprises details of construction, which will be more fully explained by reference to the accompanying drawings, in which—

Figure 1 is a plan view of my plow. Fig. 2 is an enlarged view of the pivotal connections. Fig. 3 is a side view of a plow-carrying plate. Fig. 4 is an end view of the frame and connections.

A is an engine or other source of power which forms a center and support to which a long framework or boom B is pivoted at one end. The opposite end is fixed to the plow-frame C in any suitable manner.

The boom or frame B is made of any desired length, so that when the plow-frame is moved about the pivot-point of the boom the plow-frame will travel over a width of a diameter nearly twice as great as the length of the boom. The boom is suitably trussed and braced to give it the necessary rigidity, and, if desired, may be supported upon wheels intermediate between its pivot-point and the plow-frame.

The plow-frame is mounted upon wheels D, those farthest from the boom being made of larger diameter and of such proportion to the inner ones that the frame will easily follow the circular track about the pivot-center.

Upon the plow-frame are mounted plows of any suitable or desired description, and power to drive the apparatus is derived from the engine A by means of a belt E, passing from a drive-pulley on the engine to the pulley F upon the plow-frame. In order to keep the belt E upon its pulleys while the plow-frame moves from side to side, the belt is caused to pass between direction-pulleys G at the pivot-point, and this allows the belt to bend out of the direct course of the driving-pulley and still maintain its bearing upon the driving and driven pulleys. On the shaft of the pulley F is a beveled gear, which engages a corresponding beveled gear, as shown at H. Upon the shaft of the second gear is a sprocket or other driving-wheel I, and a chain passing around this sprocket-wheel and around a sprocket-wheel J, fixed upon one of the shafts of the wheels D, serves to transmit power to drive the plow-frame in an arc of a circle.

It will be manifest that any form of belt-gear or other transmitting mechanism may be employed and that the power may be transmitted to one or both of the wheel-shafts, as may be found necessary for the proper operation of the machine.

Various forms of plows—such as the ordinary moldboard-plow, rotary, or other forms—may be fixed upon the plow-frame and so operated as to turn and cultivate the soil.

In the present case I have shown the plows K fixed to the lower edges of strong frames or plates L, the upper edges of which are journaled upon crank-shafts O O'. One of these cranks is here shown as formed upon the shaft of the driving-pulley F, and the other cranks are formed in an independent shaft at the opposite end of the plow-frame. The two crank-shafts are connected and caused to move in unison by means of a driving-chain P, passing around sprocket-wheels Q upon the two shafts. In the drawings I have shown two of these plates, each mounted upon a crank and the cranks projecting in opposite directions from the crank-shafts, so that the plates will be alternately lifted and depressed, traveling in arcs of circles. When the plates are depressed, the plowshares carried upon the lower edges will be forced into the ground, and when lifted they will be correspondingly raised, and as they alternate the ground will be thoroughly broken up and cultivated as the plow-frame moves in its arc of travel and transversely to the line of movement of the plows. In order to prevent a side strain upon the plates caused by the advancing movement of the plow-frame while the plows are passing through the ground at the lower part of the movement, I have shown brace-rods R, one end of each of which is loosely connected with the bottom of one of the plates, and the other ends of the rods are loosely connected with the plow-frame, so that while acting to prevent the side movement of the plates they allow the free circular movement caused by the action of the cranks. In this manner the plates will be strongly braced, while being allowed a thorough freedom of movement in their arcs of travel.

The operation will then be as follows: The plow being at the extreme limit of its travel at one side, the engine being started will through its connections cause the plow-frame to travel in an arc of a circle about the pivot-point of the guiding-boom. At the same time the plates L, which carry the plows, will be rotated, so as to alternately carry their plows through the surface beneath them, thus turning and thoroughly breaking it up until the plow has advanced to the opposite side of its arc of travel. This is preferably so far around that the boom will make a very considerable angle with the line of travel of the engine, so that when the engine is advanced to make a new cut the movement of the plow-frame may be continued until the engine has reached its new position. The driving mechanism is then reversed by any suitable reversing-gear, such as is well known in machinery, and the plow starts back on its arc of travel, just overlapping the arc which has previously been plowed, and in this manner a width of ground nearly double the length of the boom can be plowed during the advance of the engine across the field. With a boom fifty feet in length a space of from ninety to one hundred feet in width may be plowed in one advance across the field, and when this has been completed the apparatus can be reversed, thus moving backward and forward until the whole field has been properly plowed. This allows a comparatively-light engine to be used on soft or marshy land, its power being applied to driving the plows while the engine itself remains stationary, and when the plows have completed a cut the forward movement of the engine takes but little more power than is necessary to move itself. If desired, the plow-carrier cranks may be set so that the plows at one end will enter the ground in advance of the other end to reduce the strain on the working parts.

Having thus described my invention, what I claim as new, and desire to secure by Letters Patent, is—

1. A plow and frame, a boom connecting it with a distant center and a power mechanism by which the frame is caused to traverse an arc about its center of motion.

2. A plow-frame mounted upon wheels and plows carried thereon, a boom connecting the plow-frame with a distant center about which it is movable, mechanism carried by the plow-frame to which power is transmitted whereby the plow-frame is caused to move in the arc of a circle about its center of motion.

3. Plows carried upon a frame mounted upon wheels, a motor situated at a distance from the plow-frame, a boom having one end connected with the plow-frame and the other pivoted to the motor, connections between said motor and the plow-frame through which power is transmitted, driving mechanism connecting with the wheels of the plow-frame whereby it is caused to travel in an arc about the center of motion to which the boom is connected.

4. A plow-frame mounted upon wheels, plows carried thereon, a boom having one end fixed to the plow-frame and the other pivoted to a motor, a belt by which power is transmitted from the motor to the plow-frame and direction-pulleys upon the motor in line with the center of motion of the boom whereby the belt is maintained in line with its pulleys and allowed to follow the movements of the plow-frame.

5. A plow-frame mounted upon wheels, a boom having one end connected with the plow-frame, the other end pivoted to a motor, means for transmitting power from the motor along the boom of the plow-frame, carrier-plates mounted upon cranks movable in arcs at right angles with the direction of travel of the plow-frame, and plowshares fixed to the lower edges of said carriers.

6. A plow-frame, mechanism by which it is caused to travel over the ground, crank-shafts journaled upon the frame with mechanism by which they are rotated, carrier-plates having the upper edges suspended from the crank-shafts and movable in planes transverse to the line of travel of the plow, said carriers having plows fixed to their lower edges.

7. A plow-frame, mechanism by which it is advanced over the surface of the ground, carrier-plates having their upper edges suspended from crank-shafts, plows carried upon the lower edges of said plates, mechanism by which the plates are movable in circular arcs to carry the plows through the ground, and bracing-rods having one end connecting with the plow-frame and the other with the movable carrier-plates.

8. The combination with a motor of a boom having one end pivoted to the motor, plows to the frame of which the opposite end of the boom is connected, and mechanism by which power is transmitted from the motor to drive the plows in arcs about the pivot-point.

In witness whereof I have hereunto set my hand.

ALEXANDER G. CARTER.

Witnesses:
 S. H. NOURSE,
 GEO. H. STRONG.